A. H. JACKSON.
LAMP-CHIMNEY CLEANER.
No. 186,934. Patented Feb. 6, 1877.
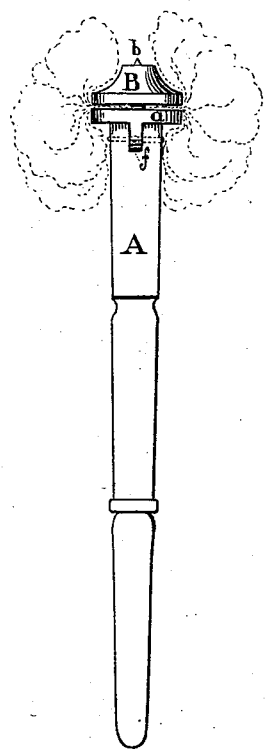
Fig. 1.
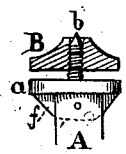
Fig. 2.
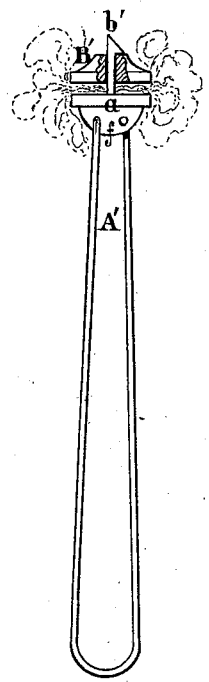
Fig. 3.
(Superficial view of Block B', fig 3.)
Witnesses
Clarence Thurlow
A. Armiston
Albert H. Jackson
by E. Thurlow
his atty in fact

UNITED STATES PATENT OFFICE.

ALBERT H. JACKSON, OF LA FAYETTE, ILLINOIS.

IMPROVEMENT IN LAMP-CHIMNEY CLEANERS.

Specification forming part of Letters Patent No. 186,934, dated February 6, 1877; application filed December 30, 1876.

*To all whom it may concern:*

Be it known that I, ALBERT H. JACKSON, of La Fayette, in the county of Stark, in the State of Illinois, have invented an Improvement in Lamp-Chimney Cleaner; and do hereby declare that the following is a full, clear, and exact description thereof, reference being had to the annexed drawings, making a part of this specification, in which like letters of reference refer to like parts, and in which—

Figure 1 represents an elevation of the cleaner; Fig. 2, a cross-section; Fig. 3, another form for the handle or stick.

The object of my invention is to simplify the means of holding and adjusting wipers for cleaning the interior of lamp-chimneys; and it consists of a nut and screw upon the end of a stick or handle, the screw being a small projecting point to perforate and receive several layers of cloth, paper, or other wipers. However, the screw-point is not essential, and it may be substituted by a plain projecting pin with a cross terminal side lug, over which the nut or terminal block can be passed by means of a slot in the latter, and the block be retained by a slight turn of the same, in which the side lug lies across said slot.

One of the forms in which I construct this implement is as follows: A is the stick or handle, which is terminated by a disk or shoulder, *a*, provided with a small projecting stem or screw, *b*, fitted with a nut or block, B, between which and the disk or shoulder *a* the wiping material is compressed and held. The disk *a* and nut B may be made from one inch to one and a half inch in diameter, and the shoulder *a* of the stick A is provided with a transverse rib, *f*, or lower extension, by which to connect the same with the handle, through which a pin is passed after the rib enters the corresponding slot in said stick or handle. In place of the rib *f*, a tang or sharp stem in the base of the disk or shoulder *a* may be used. Again, use in place of the stick A a doubled wire, Fig. 3, whose ends are passed through corresponding holes in the rib *f* of the shoulder *a*, and are each clinched or riveted there.

What I claim as my invention is—

1. A stick or handle ending in a surface or shoulder, *a*, provided with a stem or pin, projecting therefrom at right angles, to receive a nut or disk, B, for holding the wiper between them, the pin being provided with a screw-thread; substantially as and for the purposes described.

2. The lower disk or shoulder *a*, screw *b*, and upper disk or block B, adjustable to hold a cloth, brush, or other chimney-wiper for lamp-chimneys.

In testimony that I claim the foregoing lamp-chimney cleaner, I have hereunto set my hand this 20th day of December, A. D. 1876.

ALBERT H. JACKSON.

Witnesses:
ADAM BRONSON,
HENRY W. WELLS.